United States Patent Office 3,117,472
Patented Jan. 14, 1964

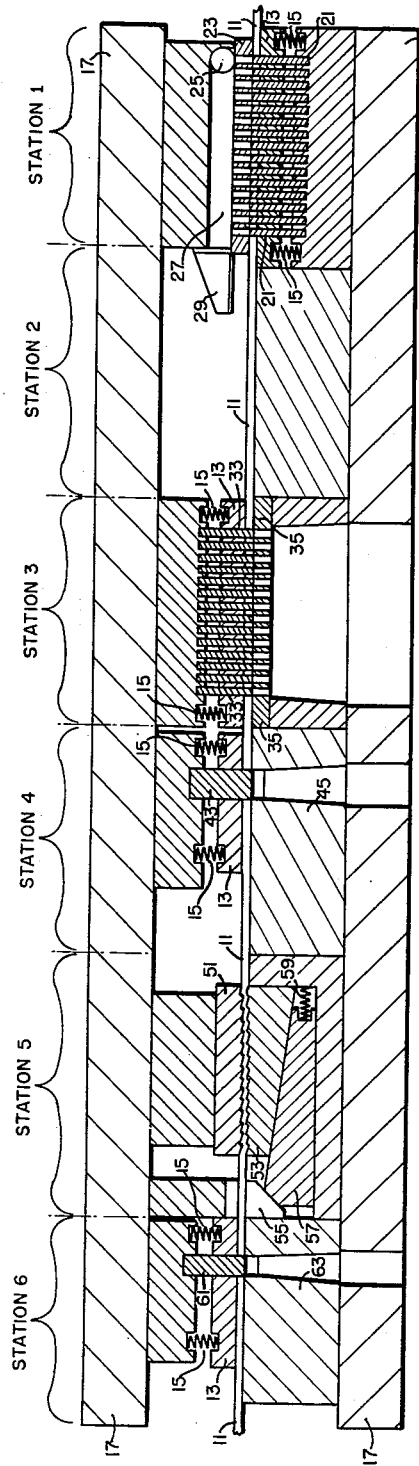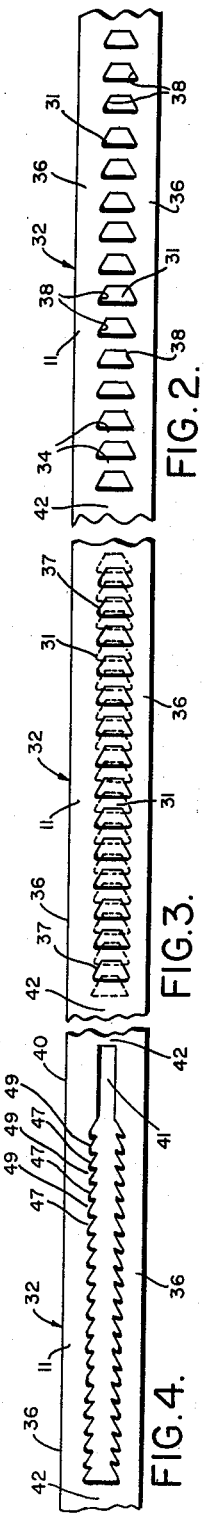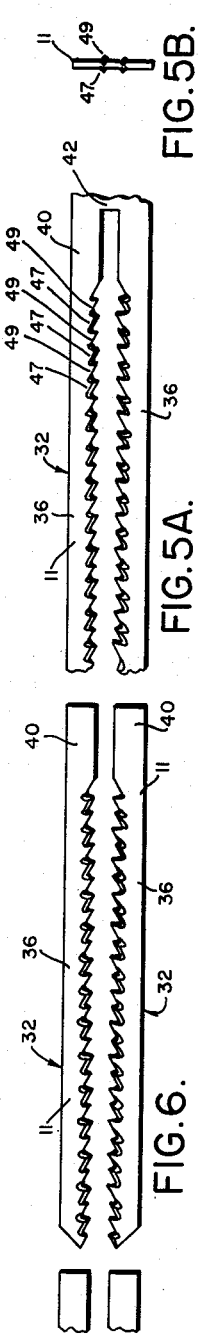

3,117,472
MANUFACTURE OF SAW BLADES BY PUNCH-PRESS OPERATION
Leonard E. Mingus and Myron R. Huss, Rochester, N.Y., assignors to William P. Stein & Co., Inc., Rochester, N.Y., a corporation of New York
Filed Mar. 1, 1962, Ser. No. 176,552
1 Claim. (Cl. 76—112)

This invention relates to a method for making saw blades, and, more particularly, to the manufacture of saw blades by punch-press operation.

At the present state of the art, the manufacture of saw blades by punch-press operation is less than satisfactory due to the fact that the cutting edges of the teeth formed by operation of the press cannot be made satisfactorily clean and sharp. Even with a very sharp punch and die, the points and edges of the teeth tend to become rounded and weak. However, with unique method described herein, it is possible to manufacture a saw blade with a series of punch-press operations wherein the resulting blade will have teeth of optimum sharpness and strength.

An object of this invention is the provision of a generally improved and more satisfactory method of making a saw blade more quickly, economically, and accurately than is possible with the methods of the prior art.

Still another object is to provide a method for the manufacture of a saw blade by punch-press operation wherein the resulting blade will have sharp strong teeth.

A further object is to provide a method for the manufacture of a complete saw blade by the continuous operation of a single punch-press using a progressive die.

A still further object is to provide a method for the manufacture of saw blades wherein the teeth of each blade are punched out by two overlapping cuts made in two separate and distinct stages.

Another object is to provide a method for the manufacture of saw blades by punch-press operation so that the burr left on the edge of the steel due to the punching operation is staggered in such a manner that the burr appears on the side of each tooth toward which that particular tooth is set, whereby, following the setting of the teeth of the blade, each tooth is left with a sharp burr edge as its cutting surface.

These and other desirable objects may be attained in the manner disclosed as an illustrative embodiment of the invention in the following description and in the accompanying drawings forming a part hereof, in which:

FIG. 1 is a cross-sectional view of a six-station progressive die embodying the apparatus aspect of invention herein, for carrying out the method aspect thereof;

FIG. 2 is a plan view of stock which has just passed through Station 1 of the progressive die illustrated in FIG. 1;

FIG. 3 is a plan view of stock which has been cut only by Station 3 of the progressive die illustrated in FIG. 1, and in which the cuts made at Station 1 and illustrated in FIG. 2 are shown superimposed in dotted lines;

FIG. 4 is a plan view of the stock after it has progressed from Station 1 through 4 of the die illustrated in FIG. 1;

FIGS. 5A and 5B are plan and end views, respectively, of the stock after it has passed from Station 1 through Station 5 of the progressive die illustrated in FIG. 1; and FIG. 6 is a plan view of the two saw blades which are finally formed from the stock after it has been completely processed through all six stations of the progressive die illustrated in FIG. 1.

It should be understood that while the particular embodiment of the invention which is described herein is concerned with the manufacture of a sabre saw blade by the continuous operation of a single press utilizing a progressive die, the invention herein can be utilized by a series of single press operations and can be used to manufacture blades of other types as well.

It is believed that the nature of the invention, its advantages and characteristic features, can be best understood by describing the progress of a piece of stock through the various stations of the progressive die illustrated in FIG. 1. For purposes of the following description the position of the progressive die illustrated in FIG. 1 assumes that the press has been operated to the point where the punches at each successive station have just passed completely through the stock being processed.

Referring now to FIG. 1, stock 11, being strip steel of suitable thickness and hardness for saw blade use, is fed into the progressive die at Station 1, being maintained in position by pressure pads 13 and springs 15 which are suitably mounted on shoes 17. At Station 1 a series of punches 21 cooperate with die 23 to knock a group of slugs out of stock 11. Since punches 21 are acting from the bottom surface of the stock, it is necessary that die 23 be supplied with heavy air pressure through aperture 25 for the purpose of blowing the resulting slugs out of die cavity 27 and into chute 29 so that they will not hinder further operation of the press.

After stock 11 has been acted upon by Station 1 of the progressive die illustrated in FIG. 1, it appears as shown in FIG. 2, namely, with a series of equally spaced quadrilateral holes 31. It should be noted that these holes were punched from the bottom of stock 11 and that the sharp burr formed by the punching operation appears around the edges of holes 31 at the upper surface of stock 11. These quadrilateral holes 31 are punched successively in predetermined longitudinally extending spaced sections 32 of the sheet metal strip 11 which remains imperforate between these spaced sections. These holes 31 are located in longitudinally extending relation in the center of the strip. These holes 31 form transversely extending spaced parallel strips 34 in the central portion of the strip, having substantially straight parallel side edges as shown in FIG. 2. The longitudinally extending side portions 36 at opposite sides of the sheet metal strip 11 have the inner edges between strips 34 formed into angularly extending edges forming portions of saw teeth indicated at 38 in FIG. 2.

Station 2 has been left blank on the particular embodiment illustrated in FIG. 1 to facilitate description by visually separating critical Stations 1 and 3. At Station 3, a group of punches 33 cooperates with die 35 to punch out another group of slugs from stock 11. As different from Station 1, punches 33 at Station 3 act on the upper surface of stock 11, permitting the slugs formed at this station to fall out of the way of press operation through suitable cavities in die 35 and die shoe 17.

As the result of the action of Station 3, the stock receives another series of quadrilateral holes 37 as illustrated in FIG. 3 by solid lines. Since the holes 37 formed at Station 3 were punched from the upper surface of stock 11, the sharp burr left by the punching process appears around the edges of holes 37 at the lower surface of stock 11. While this series of quadrilateral holes is similar to the series made in stock 11 at Station 1 and illustrated in FIG. 2, it is spaced in such a manner as to over-lap and intercept the series of holes initially punched at Station 1. To illustrate this over-lapping effect, the quadrilateral holes 31 punched at Station 1 are shown in FIG. 3 by means of dotted lines.

The punches 33 at Station 3 extend beyond the opposite side edges of the transversely extending strip 34 into the holes 31 on opposite sides of the strip 34. Each punch will punch a portion of a hole 37 by punching out one of the transversely extending strips 34. Each punch will also form the inner edges of the longitudinally extending spaced side portions 36 into an angularly extending saw tooth edge connecting the saw tooth sections 38. This second punching operation completes the formation of continuous saw tooth edges along the inner edges of side portions 36 with a slot extending longitudinally throughout the central portion of longitudinally extending spaced sections 32.

As a result of the interception of the holes cut at Station 3 with the holes initially cut in stock 11 at Station 1, when stock 11 leaves Station 3 it has a hole in its center with serrated sides as illustrated by the combined dotted and solid lines shown in FIG. 3. Since each point of the serrated sides has been cut by two separate and distinct punching operations, each resulting point is clean and sharp, while the leading surface of each successive serration has a sharp burr edge alternately on the upper and lower side of the inner edges of the side portions 36 of the sheet metal strip or stock 11.

FIG. 4 illustrates a plan view of stock 11 following the operation of Station 4 of the progressive die illustrated in FIG. 1. At Station 4, slot 41 is cut in another section 40 of the metal strip 11 at the trailing end of the serrated hole in stock 11 which resulted from the operations at Stations 1 and 3. Slot 41 is cut by punch 43 acting through die 45 in longitudinally extending relation in the center of section 40 of strip 11, the resulting slug falling clear of press operation through suitable cavities in die 45 and die shoe 17. The slot 41 in section 40 opens at one end into one end of the opening between the saw tooth edges along the inner edges of side portions 36 and forms the inner edges of shank portions along side portions 36 adjacent the portions formed with the saw teeth. Attention is once again called to the fact that the leading surface 47 of each alternate serration has its sharp burr edge on the upper surface of stock 11, while alternate leading surfaces 49 have their sharp burr edges at the lower surface of stock 11. The sheet metal strip or stock 11 has sections 42 connecting the side portions 36 between the ends of the sections 40 and the adjacent ends of longitudinally extending spaced sections 32 to retain the side portions 36 together while the sheet metal strip is operated on in Station 5.

At Station 5 of the progressive die illustrated in FIG. 1, form blocks 51 and 53 act upon stock 11 to set the teeth of the prospective saw blades. Form block 51, being directly attached to upper shoe 17, is applied to stock 11 by the direct downward action of the press. On the other hand, form block 53 is raised against the lower surface of stock 11 by the action of a vertically moving kicker 55 attached to the upper shoe 17 of the press, and a horizontally moving wedge 57. With each operation of the press, kicker 55 is driven downward, forcing wedge 57 to move in a right-hand direction, compressing spring 59 and raising form block 53. As the press rises following each successive operation, spring 59 returns wedge 57 to its initial position, while stock 11, under the effect of pressure pads 13, causes form block 53 to return to its original position.

The pattern of form blocks 51 and 53 is such that the successive serrations, which were cut in the stock at Stations 1 and 3 as explained above, are set alternately above and below the upper and lower surfaces of stock 11 in a manner which varies in accordance with the ultimate use of the saw blades being manufactured. In any case, each successive serration is set so that its sharp burr edge appears on the outside, or cutting surface of the blade. This can be seen in FIGS. 5A and 5B which are a plan view and an end view, respectively, of stock 11 after it has been processed from Stations 1 through 5 of the progressive die illustrated in FIG. 1. It can be seen from FIG. 5A that the leading surfaces 47 of each alternate serration have been set in an upward direction, while leading surfaces 49 of the alternate serrations have been set in a downward direction. Or, in the end view illustrated in FIG. 5B, leading surfaces 47 have been set to the left, while leading surfaces 49 have been set to the right, resulting in the exposure of sharp burr edges above each major plane surface of stock 11.

At Station 6, the final station of the progressive die illustrated in FIG. 1, punch 61 operates in conjunction with die 63 to cut off and trim the ends of stock 11, the resulting slugs dropping out of the way of press operation through suitable cavities in die 63 and die shoe 17.

The punch 61 and die 63 operate on the sections 42 of the sheet metal strip 11 for severing the ends of the shank portions formed from the sections 40, from section 42. The punch 61 and die 63 also sever the sections 42 from the ends of longitudinal side portions 36. This operation severs the sheet metal strip 11 so that each of the predetermined longitudinally extending sections 32 and the shank portions forming part of sections 40 are severed from strip 11 to form a pair of duplicate individual saw blades.

Thus, after stock 11 has been completely processed through all six stations of the progressive die illustrated in FIG. 1, the resulting product is shown in FIG. 6, namely, two jig saw or saber saw blades, each having strong, sharply pointed teeth, with each successive tooth of each of these blades having a sharp burr edge on its cutting surface.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claim.

What is claimed is:

A method of making saw blades comprising the feeding of a length of sheet metal strip through a plurality of stations, punching successive predetermined longitudinally extending spaced sections of said strip at a first station with a plurality of substantially equally spaced transversely extending slots forming spaced substantially parallel transverse strip portions connecting the longitudinally extending side portions of said strip with the inner edges of said longitudinally extending side portions formed into angularly extending edges forming portions of saw teeth between said transverse strip portions, punching said longitudinally extending spaced sections at a second station to remove said transverse strip portions throughout said longitudinally extending spaced sections and form the inner edges of said longitudinally extending side portions at the ends of said transverse strip portions into angularly extending edges joining the edges formed at said first station and completing the formation of continuous saw tooth edges along the inner edges of said longitudinally extending side portions in said longitudinally extending spaced sections of said strip, offsetting said saw teeth at another station laterally relative to said strip into predetermined positions, punching another section of said strip at another station with a longitudinally extending slot opening at one end into the opening between said saw teeth at one end of said longitudinally extending spaced sections to define the inner margins of shank portions in the longitudinally extending side portions of said strip adjacent the portions formed with saw teeth while retaining opposite portions of said strip connected together between said longitudinally extending strip sections and shank forming sections, and severing said strip at a final station between adjacent ends of each said another section and each longitudinally extending spaced section to form said sections of said strip into a pair of individual substantially identical saw blades having shank portions at one end.

References Cited in the file of this patent

UNITED STATES PATENTS

| | | |
|---|---|---|
| 555,620 | Salisbury | Mar. 3, 1896 |
| 611,714 | Smith et al. | Oct. 4, 1898 |
| 1,576,908 | Hartig | Mar. 16, 1926 |
| 1,631,657 | Swett | June 7, 1927 |
| 1,754,466 | Hosking | Apr. 15, 1930 |
| 2,074,453 | Brackett | Mar. 23, 1937 |
| 2,538,844 | Nimz | Jan. 23, 1951 |